United States Patent
Shimizu

(10) Patent No.: US 11,648,656 B2
(45) Date of Patent: May 16, 2023

(54) ELECTRIC HANDHELD WORKING MACHINE

(71) Applicant: YAMABIKO CORPORATION, Tokyo (JP)

(72) Inventor: Kunio Shimizu, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 329 days.

(21) Appl. No.: 16/912,181

(22) Filed: Jun. 25, 2020

(65) Prior Publication Data
US 2020/0406415 A1 Dec. 31, 2020

(30) Foreign Application Priority Data

Jun. 28, 2019 (JP) .............................. JP2019-121838

(51) Int. Cl.
*B23Q 11/14* (2006.01)
*A01G 3/053* (2006.01)
(Continued)

(52) U.S. Cl.
CPC .............. *B25F 5/008* (2013.01); *A01G 3/053* (2013.01); *B25F 5/02* (2013.01); *H01M 10/613* (2015.04);
(Continued)

(58) Field of Classification Search
CPC ..................... A01G 3/053; A01G 3/086; A01G 2003/0461; B25F 5/008; B25F 5/02; H01M 10/613; H01M 2220/30
(Continued)

(56) References Cited

U.S. PATENT DOCUMENTS

| 8,786,254 B2 * | 7/2014 | Ogura .................... H01M 10/46 320/112 |
| 9,138,884 B2 | 9/2015 | Heinzelmann et al. |

(Continued)

FOREIGN PATENT DOCUMENTS

| DE | 102011077850 A1 | 12/2012 |
| EP | 2431132 A2 | 3/2012 |

(Continued)

OTHER PUBLICATIONS

European Search Report cited in corresponding International Application No. 20182267.3 filed Nov. 23, 2020.

*Primary Examiner* — Thomas M Wittenschlaeger
*Assistant Examiner* — David G Shutty
(74) *Attorney, Agent, or Firm* — Bacon & Thomas, PLLC

(57) ABSTRACT

An electric handheld working machine includes: a housing including: a motor as a drive source of a working unit; an operating handle; and attaching members provided on an outer surface of the housing and configured to attach a battery to supply electric power to the motor. The attaching members includes: a connecting terminal connected to the battery; a step provided above the connecting terminal and configured to function as a drainage path to drain drops of water to sides; and openings formed in the sides of the attaching members to communicate with the drainage path. The openings communicate with a cooling air flow path configured to allow cooing air to flow through a gap between a back surface of the battery attached to the attaching members and the outer surface between the attaching member.

4 Claims, 4 Drawing Sheets

(51) Int. Cl.
  *B25F 5/00* (2006.01)
  *H01M 10/613* (2014.01)
  *B25F 5/02* (2006.01)
  *A01G 3/04* (2006.01)
(52) U.S. Cl.
  CPC . *A01G 2003/0461* (2013.01); *H01M 2220/30* (2013.01)
(58) Field of Classification Search
  USPC ........................................................ 173/217
  See application file for complete search history.

(56) References Cited

U.S. PATENT DOCUMENTS

| | | | |
|---|---|---|---|
| 9,676,263 B2 * | 6/2017 | Larray | ............... B62M 6/90 |
| 9,890,755 B2 * | 2/2018 | Koenen | ............... F02N 11/08 |
| 10,537,983 B2 * | 1/2020 | Dyer | ............... B25F 3/00 |
| 2002/0197527 A1 * | 12/2002 | Moores, Jr. | ....... H01M 10/6557 |
| | | | 429/96 |
| 2005/0202310 A1 | 9/2005 | Yahnker | |
| 2011/0154796 A1 | 6/2011 | Onose | |
| 2011/0248583 A1 | 10/2011 | O'Banion | |
| 2011/0303718 A1 * | 12/2011 | Spasov | ............... B25F 5/006 |
| | | | 165/287 |
| 2012/0327573 A1 * | 12/2012 | Glauning | ............ H01M 50/213 |
| | | | 361/679.01 |
| 2015/0244194 A1 * | 8/2015 | Tabuchi | ............... H02J 7/0013 |
| | | | 320/107 |
| 2018/0369939 A1 * | 12/2018 | Zimmerman | ........ B23D 47/02 |
| 2019/0358801 A1 * | 11/2019 | McCue | ............ B25F 3/00 |
| 2020/0251696 A1 * | 8/2020 | Qiao | ............... H01M 50/543 |

FOREIGN PATENT DOCUMENTS

| | | | | |
|---|---|---|---|---|
| JP | H06_62638 A | | 3/1994 | |
| JP | 2011_135840 | | 7/2011 | |
| JP | 2016049082 A | * | 4/2016 | ............ A01D 34/13 |
| JP | 2019_062764 | | 4/2019 | |
| WO | WO2013_062457 A1 | | 5/2013 | |

* cited by examiner

ELECTRIC HANDHELD WORKING MACHINE

CROSS-REFERENCE TO RELATED APPLICATIONS

The present application claims priority from Japanese Patent Application No. 2019-121838 filed on Jun. 28, 2019, and the entire contents of which are hereby incorporated by reference.

BACKGROUND

1. Technical Field

The present invention relates to an electric handheld working machine.

2. Related Art

As an electric handheld working machine, there have been known a hedge trimmer as disclosed in Japanese Unexamined Patent Application Publication No. 2011-135840 (hereinafter JP No. 2011-135840), a chain saw as disclosed in U.S. Pat. No. 9,138,884 (hereinafter U.S. Pat. No. 9,138,884), and a brush cutter as disclosed in Japanese Unexamined Patent Application Publication No. 2019-62764 (hereinafter JP No. 2019-62764).

In such an electric handheld working machine, a motor and a battery which is a drive source of a working unit are provided in a housing including an operating handle, and a motor room and a battery room are provided in the housing in general. In addition, as disclosed in U.S. Pat. No. 9,138,884, the upper surface of the battery room is open to take the air from the battery room into the motor room, and therefore to cool the motor and a control board in the motor room In the case where both the motor and the battery are stored in the housing as above-described related art, it is necessary to make sufficient space in the housing for the real volume of the motor and the battery. Accordingly, it is unavoidable to increase the size of the housing. However, as described above, the housing includes the operating handle, and therefore the increase in size of the housing makes it difficult to handle the working machine.

To solve this problem, the battery may be attached to the outside of the housing. However, the handheld working machine is essentially used outdoors, and therefore, when the battery is attached to the outside of the housing, the handheld working machine needs to have a structure to prevent the connecting terminal of the battery externally attached to the housing from being exposed to rain. In addition, when a large battery is attached to the outside of the housing to increase the period of time for continuous work, the battery occupies a considerable area of the surface of the housing. Consequently, it makes it difficult to make a place to provide a cooling air flow path to take the cooling air into the housing.

Moreover, since it is indispensable to properly cool the motor and the control board to continuously operate the electric working machine, the electric working machine generally has a structure where an intake port is provided in the surface of the housing and the motor and control board are disposed near the intake port in the housing. Here, the handheld working machine disclosed in the above-described related art is used under the condition where foreign materials such as cut plants and dust fly around the machine, and therefore the intake port provided in the surface of the housing is prone to be clogged with the foreign materials. Then, when the foreign materials having entered the intake port adhere to the motor and the control board disposed near the intake port, it is not possible to properly cool the motor and the control board.

SUMMARY

To solve the above-described problem, it is desirable to provide an electric handheld working machine capable of reducing the size of the housing by attaching the battery to the outside of the housing accommodating the motor; preventing the connecting terminal of the battery from being exposed to rain with a simple structure; providing a cooling air flow path to take the air for cooling the motor and so forth into the housing in a space-efficient manner while preventing the rain from entering the housing; and properly cooling the motor and the control board during the continuous operation by providing an intake port in the housing at a position to prevent the intake port from being clogged with foreign materials and to prevent the foreign materials from entering the intake port.

An aspect of the present invention provides an electric handheld working machine including: a housing including: a motor as a drive source of a working unit; an operating handle; and attaching members provided on an outer surface of the housing and configured to attach a battery to supply electric power to the motor. The attaching members includes: a connecting terminal connected to the battery; a step provided above the connecting terminal and configured to function as a drainage path to drain drops of water to sides; and openings formed in the sides of the attaching members to communicate with the drainage path. The openings communicate with a cooling airflow path configured to allow cooing air to flow through a gap between a back surface of the battery attached to the attaching members and the outer surface between the attaching members.

According to the present invention, it is possible to reduce the size of the housing by attaching the battery to the outside of the housing accommodating the motor; prevent the connecting terminal of the battery from being exposed to rain with a simple structure; and improve the space efficiency by providing the cooling air flow path to take the air for cooling the motor and so forth into the housing so as to be also used as a drainage path while preventing the rain from entering the housing.

In addition, the cooling air flow path is formed to flow the cooling air from openings formed in the sides of the attaching members to attach the battery through a gap between the back surface of the battery attached to the attaching members and the outer surface of the housing between the attaching members. By this means, even though the electric handheld working machine is used under the condition where foreign materials such as cut plants and dust fly around the machine, the above-described openings and gap function as filters to prevent the foreign materials from entering the housing. Moreover, the intake port to take the cooling air into the housing through the cooling air flow path is provided above the attaching members at an appropriate position to prevent the foreign materials from entering the housing and not to interfere with the work. Consequently, it is possible to properly cool the motor and the control board in the housing during the continuous operation.

DETAILED DESCRIPTION

Figure 1:
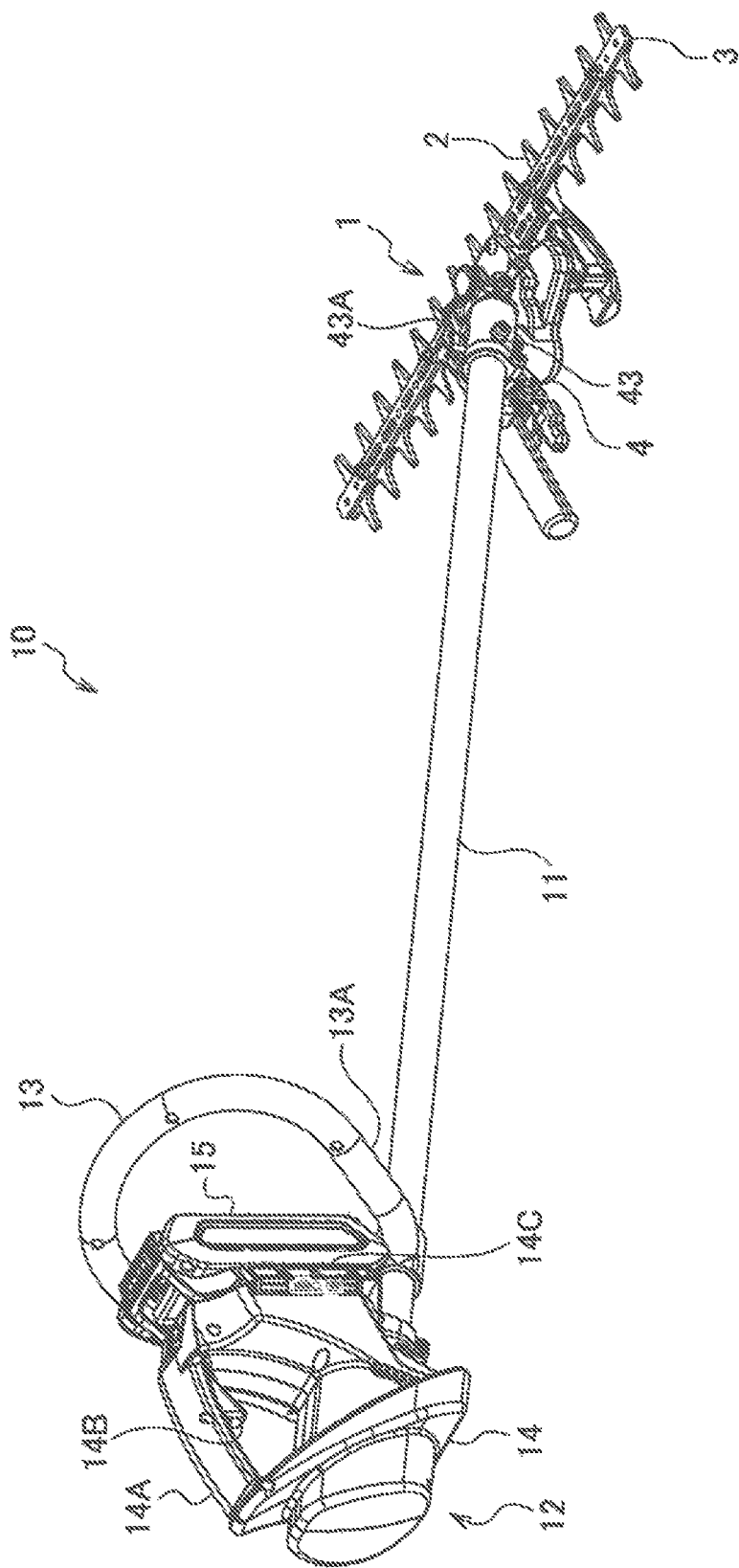
FIG. 1 is an overall perspective view illustrating an example of an electric handheld working machine according to an embodiment of the present invention.

Hereinafter, an embodiment of the present invention will be described with reference to the drawings. The same reference numbers in the different drawings indicate the same functional parts, and therefore repeated description for each of the drawings is omitted. Although a brush cutter with reciprocating blades will be described as an example of the electric handheld working machine, the electric handheld working machine is not limited to the brush cutter.

An electric handheld working machine (hereinafter simply referred as "working machine") 10 includes an operating rod 11. A reciprocating blade apparatus 1 is mounted to the top end of the operating rod 11, and an electric drive unit 12 is mounted to the base end of the operating rod 11. The drive unit 12 includes a motor which is a drive source of the reciprocating blade apparatus 1 as a working unit.

The reciprocating blade apparatus 1 includes a blade member 2 reciprocably supported by a support member 3. The support member 3 is attached to a transmission case 4. The transmission case 4 includes a power train to which a drive force is transmitted from a drive shaft in the operating rod 11. The power train is configured to convert the rotation of the drive shaft to reciprocating motion. The drive force of the drive shaft allows the blade member 2 coupled to the power train to reciprocate along the longitudinal direction of the blade member 2.

The top end of the operating rod 11 is mounted to an operating rod mount 43 of the transmission case 4. The operating rod mount 43 is mounted to the transmission case 4 via an angle adjustment mechanism 43A. The angle adjustment mechanism 43A can adjust the rising angle of the operating rod 11 from the working surface of the blade member 2.

The drive unit 12 configured to drive the drive shaft is provided at the base end of the operating rod 11, and a front handle 13 is provided in the base end side of the operating rod 11. The front handle 13 includes a grip 13A above the operating rod 11.

The drive unit 12 is configured to drive the blade member 2 of the reciprocating blade apparatus 1 via the drive shaft in the operating rod 11 as described above, and includes a housing 14 to accommodate the motor disposed approximately coaxially with the operating rod 11. An operating handle or rear handle 14A including an operating switch 14B configured to turn on and off the reciprocating blade apparatus 1 is provided in the housing 14. A battery 15 configured to supply electric power to the motor in the housing 14 is externally attached to the housing 14.

Figure 2:
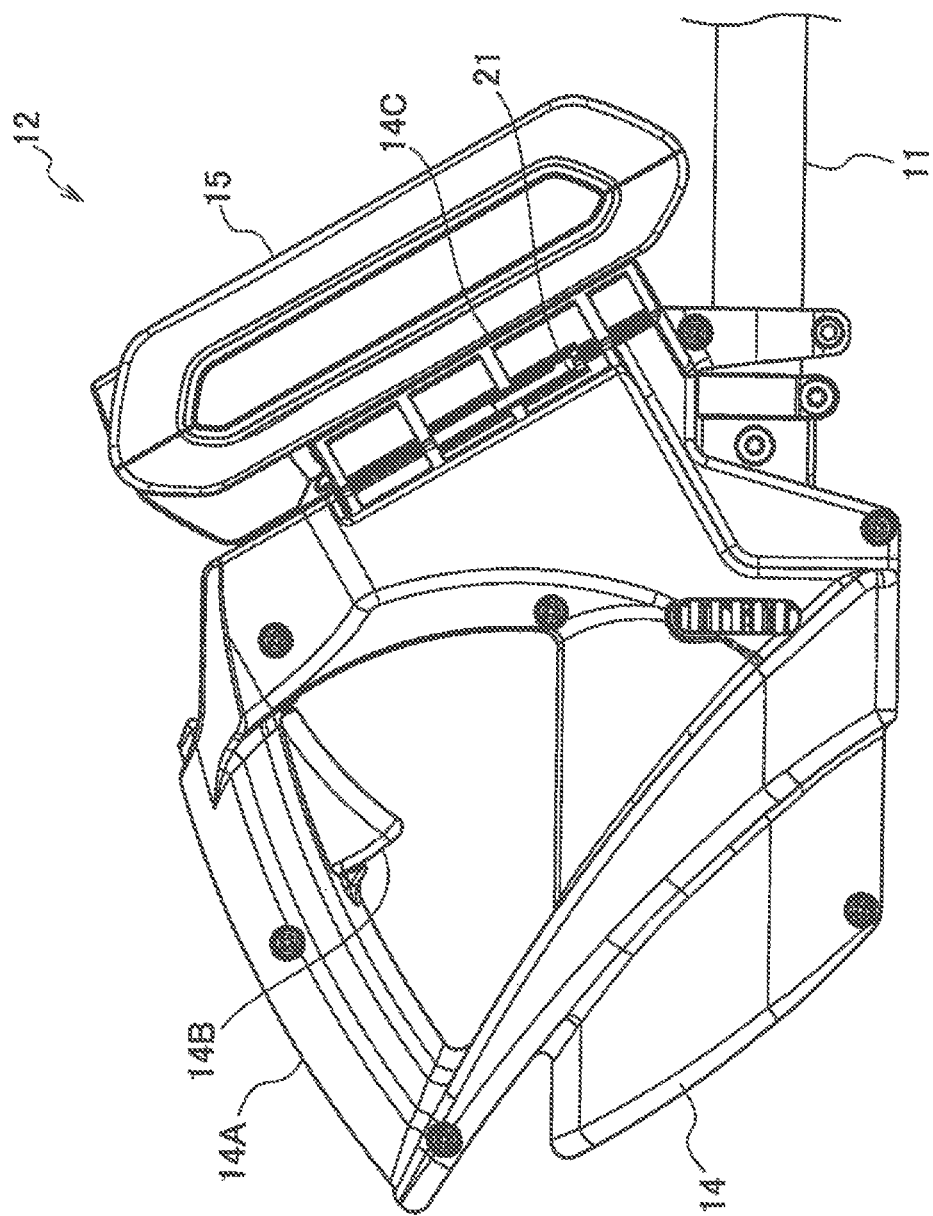
FIG. 2 is a side view illustrating a drive unit of the electric handheld working machine.
Figure 3:
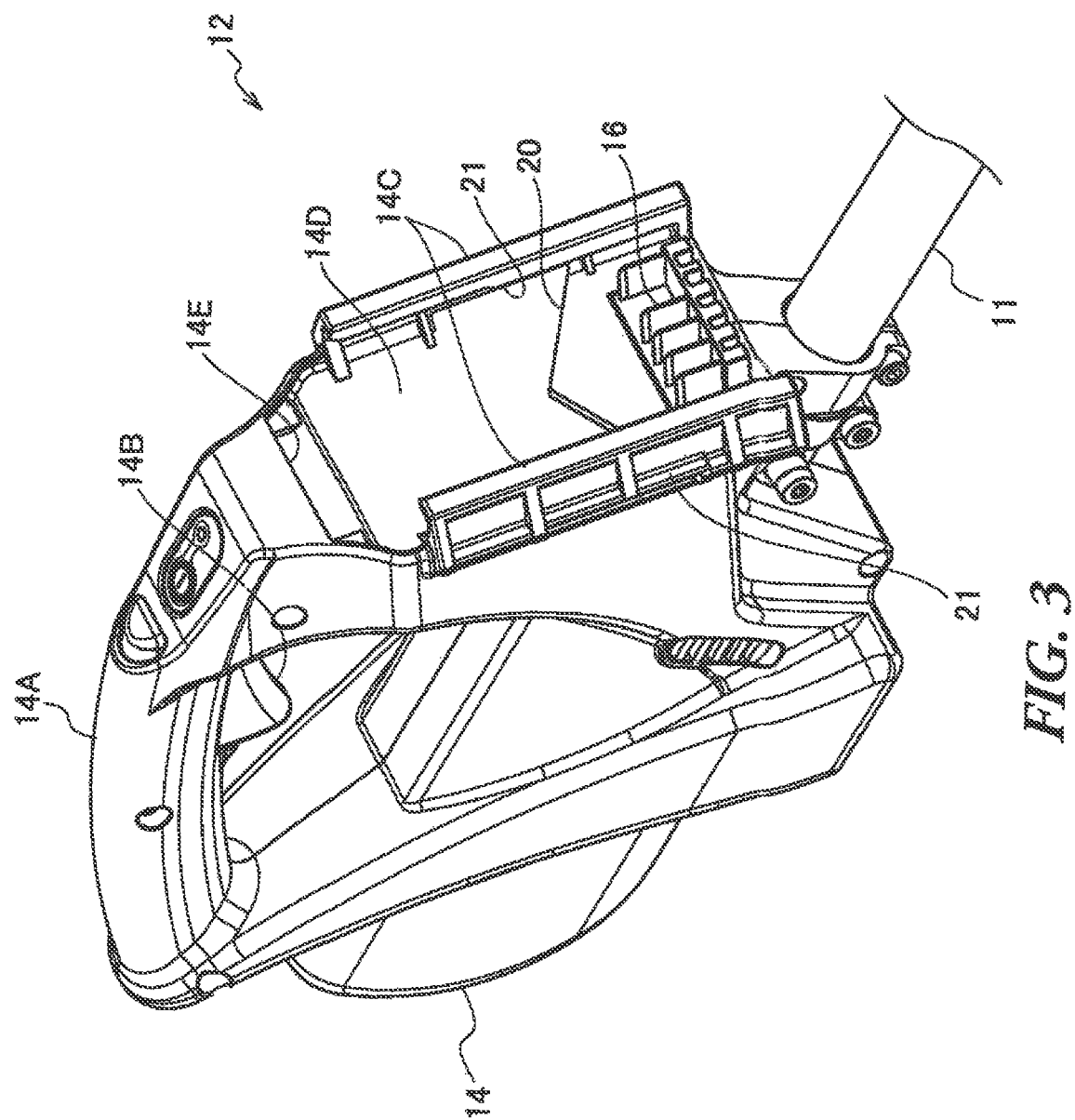
FIG. 3 is a perspective view illustrating battery attaching members of the drive unit.
Figure 4:
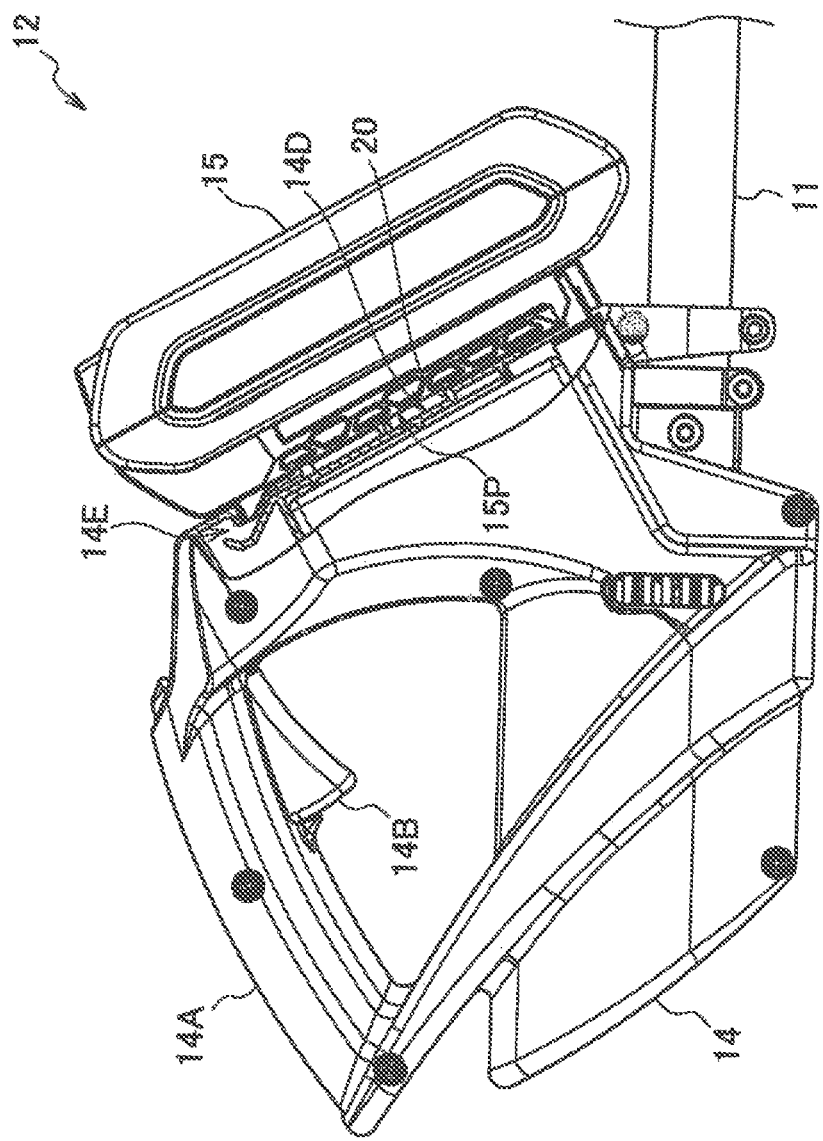
FIG. 4 is a cross-sectional view illustrating part of the battery attaching member.

As illustrated in FIGS. 2 to 4, the housing 14 of the drive unit 12 includes attaching members 14C for attaching the battery 15. The attaching members 14C are provided with a connecting terminal 16 connected to the battery 15. A step 20 is provided between the attaching members 14C above the connecting terminal 16. In addition, an opening 21 is formed in the side of each of the attaching members 14C.

Here, the step 20 functions as a drainage path to drain drops of water on an outer surface 14D between the attaching members 14C to the sides. That is, as illustrated, the top surface of the step 20 is an inclined surface having the center higher than the sides, and receives the drops of water falling via the outer surface 14D to drain the water to the sides along the inclined surface. Here, the top surface of the step 20 is not limited to the illustration, but an inclined surface to allow the drops of water to flow to one of the sides may be applicable.

This step 20 is provided above the connecting terminal 16, and therefore even though the housing 14 is wet with rain and the drops of water falls via the outer surface 14D between the attaching members 14C, the step 20 drains the water to the sides of the attaching members 14C. By this means, it is possible to prevent the connecting terminal 16 from being wet when the water falls via the outer surface 14D.

When the battery 15 is attached to the attaching members 14C, a gap is formed between a back surface 15P of the battery 15 and the outer surface 14D between the attaching members 14C. Then, the openings 21 formed in the sides of the attaching members 14C communicate with the gap.

The above-described gap, and the openings 21 formed in the sides of the attaching members 14C function to drain the water on the housing 14 without affecting the connecting terminal 16. That is, the openings 21 are configured to communicate with the drainage path formed by the step 20. Therefore, the water flowing along the inclined top surface of the step 20 passes through the openings 21 and is drained out of the attaching members 14C. In this way, the gap formed between the attaching members 14C while the battery 15 is attached to the attaching members 14C, and the openings 21 formed in the sides of the attaching members 14C function as the drainage path to drain the water or rain entering between the attaching members 14C to the outside.

Then, as illustrated, an intake port 14E to take cooling air into the housing 14 is formed to face downward above the attaching members 14C. By this means, the openings 21 also function as intake ports communicating with the cooling air flow path that allows the cooling air to flow through the gap between the back surface 15P of the battery 15 attached to the attaching members 14C and the outer surface 14D between the attaching members 14C. In this case, the cooling air flow path configured to flow the cooling air from the openings 21 to the intake port 14E through the gap allows the cooling air to flow upward, and the intake port 14E to take cooling air into the housing 14 is formed to face downward. Therefore, it is possible to prevent the rain from entering the housing 14 from the intake port 14E.

When the large battery 15 is attached to the attaching members 14C, the outside of the intake port 14E provided above the attaching members 14C is covered with the battery 15. However, as described above, the cooling air flow path is formed to flow the cooling air from the openings 21 into the intake port 14E through the gap between the back surface 15P of the battery 15 and the outer surface 14D between the attaching members 14C. Accordingly, it is possible to provide the cooling air flow path to flow the air for cooling the motor and so forth in the housing 14 in a space-efficient manner while preventing the rain from entering the housing 14.

The handheld working machine 10 illustrated in FIG. 1 is an electric brush cutter equipped with the reciprocating blade apparatus 1. The longitudinal direction of the blade member 2 intersects the longitudinal direction of the operating rod 11, and therefore the reciprocating blade apparatus 1 is provided at the top end of the operating rod 11 to form a T-shape. This handheld working machine 10 performs brush cutting by driving the reciprocating blade apparatus 1 to move the reciprocating blade apparatus 1 along the ground while the worker holds the front handle 13 and the operating handle or the rear handle 14A of the housing 14 by the hands to keep a predetermined rising angle of the operating rod 11 from the ground.

With this handheld working machine 10, the width of the blade member 2 of the reciprocating blade apparatus 1 is the effective width, and therefore the worker simply pushes the operating rod 11 without shaking the operating rod 11 from side to side, and consequently it is possible to do the brush cutting with the effective width. Therefore, it is possible to perform the brush cutting by speedily moving the reciprocating blade apparatus 1 forward, and consequently to improve the efficiency of the brush cutting. Moreover, the reciprocating blades are used, and therefore it is possible to reduce the scattering substances during the brush cutting. By this means, it is possible to ensure the safety of the worker and the surrounding of the worker, and prevent the damage of other people's properties near the working site during the brush cutting.

In addition, the housing 14 of the drive unit 12 includes the attaching members 14C to externally attach the battery 15. Therefore, it is possible to reduce the size of the housing 14 provided with the operating handle 14A, and consequently to provide the working machine 10 with excellent handling.

Moreover, the gap formed when the battery 15 is attached to the attaching members 14C and the openings 21 formed in the sides of the attaching members 14C constitute the drainage path to drain the rain falling on the housing 14 during the work, and also constitute the cooling air flow path to flow cooling air into the housing 14. Therefore, it is possible to prevent the connecting terminal 16 connected to the battery 15 externally attached to the housing 14 from being wet with rain, and take the air for cooling the motor and so forth in the housing 14 in a space-efficient manner while preventing the rain from entering the housing 14.

Moreover, the cooling air flow path is formed to flow the cooling air through the gap between the back surface of the battery 15 attached to the attaching members 14C and the outer surface 14D between the attaching members 14C, from the openings 21 formed in the sides of the attaching members 14C for attaching the battery 15. By this means, even though the electric handheld working machine 10 is used under the condition where foreign materials such as cut plants and dust fly around the machine, the openings 21 and the gap function as filters to prevent the foreign materials from entering the housing 14. Furthermore, the intake port 14E to take the cooling air into the housing 14 through the cooling air flow path is provided above the attaching members 14C at an appropriate position to prevent foreign materials from entering the housing 14 and not to interfere with the work. Consequently, it is possible to properly cool the motor and the control board in the housing 14 during the continuous work.

Furthermore, although the foreign materials flying around the working machine 10 during the work are mainly accumulated in the openings 21, the battery 15 can be detached from the attaching members 14C. By this means, it is possible to easily remove the foreign materials by, for example, blowing the air from the insides of the attaching members 14C. In this way, the working machine 10 has a structure to make it easy to do maintenance to remove the accumulated foreign manners.

As described above, the embodiments of the present invention have been described in detail with reference to the drawings. However, the specific configuration is not limited to the embodiments, and the design can be changed without departing from the scope of the present invention. In addition, the above-described embodiments can be combined by utilizing each other's technology as long as there is no particular contradiction or problem in the purpose and configuration.

The invention claimed is:

1. An electric handheld working machine comprising:
a housing including:
a motor as a drive source of a working unit;
an operating handle; and
an attaching member provided on an outer surface of the housing and configured to attach a battery to supply electric power to the motor,
the attaching members including:
a connecting terminal connected to the battery;
a step provided above the connecting terminal when the electric handheld working machine is positioned such that the operating handle is at a top of the electric handheld working machine and configured to function as a drainage path to drain drops of water to sides of the attaching member; and
openings formed in the sides of the attaching member to communicate with the drainage path,
wherein the openings communicate with a cooling air flow path configured to allow cooling air to flow through a gap between a back surface of the battery attached to the attaching member and an outer surface of the attaching member that faces and is apart from a back surface of the battery, and
wherein a riser of the step has an inclined surface having a center higher than sides of the riser when the electric handheld working machine is positioned such that the operating handle is at a top of the electric handheld working machine.

2. The electric handheld working machine according to of claim 1, wherein an intake port is provided above the attaching member to take the cooling air into the housing through the cooling air flow path when the electric handheld working machine is positioned such that the operating handle is at a top of the electric handheld working machine.

3. The electric handheld working machine according to claim 1, wherein:
the housing is connected to a base end of the operating rod; and
the motor drives the working unit attached to a working end of the operating rod via a drive shaft in the operating rod.

4. The electric handheld working machine according to claim 3, wherein the working unit is a reciprocating blade apparatus including a reciprocating blade member extending in a direction intersecting a longitudinal direction of the operating rod.

* * * * *